(12) United States Patent
Cheong

(10) Patent No.: US 8,414,120 B2
(45) Date of Patent: Apr. 9, 2013

(54) EYEGLASS FRAME, AN EYEGLASS HINGE, AND A METHOD OF ASSEMBLING A HINGE FOR AN EYEGLASS FRAME

(76) Inventor: Lak Cheong, Hong Kong (HK)

( * ) Notice: Subject to any disclaimer, the term of this patent is extended or adjusted under 35 U.S.C. 154(b) by 87 days.

(21) Appl. No.: 13/195,971

(22) Filed: Aug. 2, 2011

(65) Prior Publication Data
US 2013/0033675 A1 Feb. 7, 2013

(51) Int. Cl.
G02C 1/00 (2006.01)
G02C 5/22 (2006.01)

(52) U.S. Cl.
USPC ............................. 351/158; 351/153; 351/178

(58) Field of Classification Search .................... 16/228; 351/111, 113, 140, 153, 158, 178
See application file for complete search history.

(56) References Cited

U.S. PATENT DOCUMENTS

| | | | |
|---|---|---|---|
| 1,504,212 A | 8/1924 | Carlson | |
| 3,066,574 A | 12/1962 | Lindblom | |
| 4,561,735 A | 12/1985 | Levoy | |
| 4,968,129 A * | 11/1990 | Grendol | ........................ 351/153 |
| 4,978,209 A | 12/1990 | Ohba | |
| 5,398,377 A | 3/1995 | Takiyama | |
| 5,462,475 A * | 10/1995 | Kennedy | ........................ 451/384 |
| 5,739,891 A | 4/1998 | Wei | |
| 5,984,472 A | 11/1999 | Kobayashi | |
| 6,260,965 B1 | 7/2001 | Kroman et al. | |
| 7,121,663 B1 | 10/2006 | Huang | |
| 7,264,349 B1 | 9/2007 | Ku | |
| 7,410,253 B2 | 8/2008 | Habermann | |
| 7,422,322 B2 | 9/2008 | He | |
| 7,484,844 B2 | 2/2009 | Spandl | |
| 7,543,931 B2 | 6/2009 | Proksch | |
| 7,604,347 B2 | 10/2009 | Gottschling et al. | |
| 2004/0223115 A1 * | 11/2004 | Zancolo | ........................ 351/153 |
| 2005/0243271 A1 | 11/2005 | Oura et al. | |
| 2007/0211210 A1 | 9/2007 | Proksch | |
| 2008/0013040 A1 | 1/2008 | Anderl | |

FOREIGN PATENT DOCUMENTS

| | | |
|---|---|---|
| CN | 101171542 | 4/2008 |
| CN | 201352284 | 11/2009 |
| CN | 201673314 | 12/2010 |
| EP | 0877278 | 11/1998 |
| JP | 2006171555 | 6/2006 |
| JP | 2008376016 | 11/2008 |
| WO | WO 2009/062790 | 5/2009 |

* cited by examiner

Primary Examiner — Jordan Schwartz
Assistant Examiner — William Alexander
(74) Attorney, Agent, or Firm — Epstein Drangel LLP; Robert L. Epstein

(57) ABSTRACT

An eyeglass frame is provided that includes a lens retaining part having an end piece, a temple piece, and a hinge connecting the end piece and the temple piece. The hinge includes a substantially cylindrical element having a slot, and a projection coupled to the temple piece and adapted to be received in the slot of the substantially cylindrical element. The hinge further includes a substantially cylindrical support member coupled to the end piece and adapted to accept the substantially cylindrical element and including retaining means adapted to maintain the projection in the slot of the substantially cylindrical element. A hinge for an eyeglass frame is provided. A method of assembling a hinge for an eyeglass frame is provided.

26 Claims, 6 Drawing Sheets

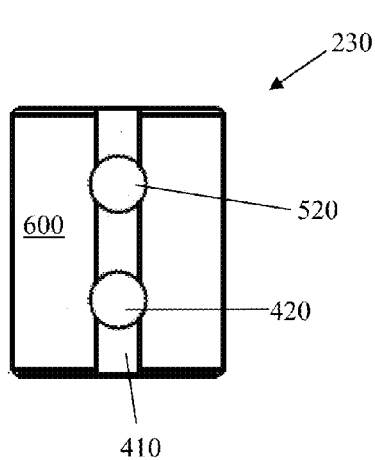
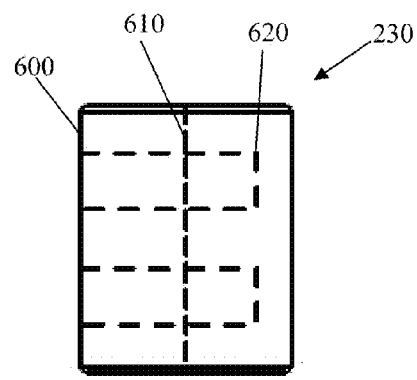
FIGURE 6A                FIGURE 6B
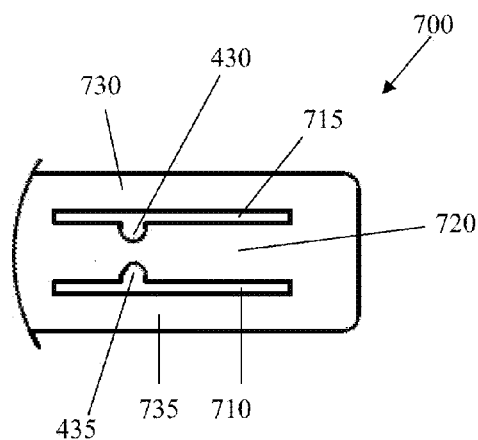
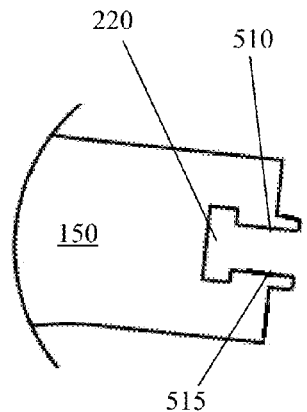
FIGURE 7                 FIGURE 8

EYEGLASS FRAME, AN EYEGLASS HINGE, AND A METHOD OF ASSEMBLING A HINGE FOR AN EYEGLASS FRAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to eyeglasses, and in particular relates to a hinge for eyeglasses.

2. Description of Prior Art

Eyeglasses may use hinges to connect temple pieces that extend over the ear and lens retaining pieces that extend across the front of a wearer's face. Hinges allow folding of the glasses for easy and safe transport and storage. Conventional eyeglass hinges use small screws that may become loosened during use and lost, rendering the eyeglasses unwearable.

U.S. Pat. No. 7,484,844 to Spandl discusses a hinge for spectacles, the hinge having two spectacle frame parts joined in an articulated manner by an axis element, the end of the first spectacle frame part having a first bend which encloses at least in part the axis element in a pivoting manner, and the second spectacle frame part being secured against rotation to the axis element. Also disclosed is a spectacle frame having this type of hinge. The claimed hinge for spectacles is characterised in that an elastic tongue is formed in the second spectacle frame part, on the side of the hinge, having a second bend which encloses at least in part the first bend of the first spectacle frame part.

U.S. Pat. No. 7,121,663 to Huang relates to an eyeglasses assembly that includes a lens frame and two eyeglass temples. The lens frame has two mounting seats provided at left and right ends, respectively. Each mounting seat has a pivot hole. Each eyeglass temple includes a coupling portion mounted pivotally to a respective one of the mounting seats. The coupling portion includes two resilient legs, and a curved pivot part disposed between the resilient legs and extending pivotally through the pivot hole in the respective one of the mounting seats. The resilient legs abut against outer faces of the mounting seats when the eyeglass temples are unfolded, and bias the curved pivot parts to move inward and limit outward movements of the eyeglass temples.

U.S. Pat. No. 6,260,965 to Kroman relates to an eyeglass frame, an eyeglass, and a method of manufacturing a hinge for an eyeglass frame. The eyeglass frame includes a frame front, a pair of temple bars and respective hinge means adapted to provide a pivotal connection of each temple bar with the frame front. According to the invention each hinge means includes a cooperating pair of friction members and a spring means adapted for applying balanced, radially directed biasing forces onto the cooperating pair of frictions members. Hereby any play in the hinge is eliminated and the friction is maintained. Further the description provides an eyeglass and a method of manufacturing an eyeglass.

Japanese Patent Application No. 20040366365 discusses providing spectacles that can be designed as a user desires by making temples detachable from wraparound endpieces without using a detaching tool while making good use of fittings of temples through support shaft bodies, and thus making a variation of spectacle frames. A temple fitting structure of spectacles is characterized in that: a support shaft body is provided with a projection portion for operation which protrudes at right angles to the length of the support shaft body; an operation hole is bored inward in the spectacles almost at right angles to the length of a temple corresponding to the projection portion for operation and the support shaft body is inserted into and arranged in a cylinder portion of the temple; the projection portion for operation is made appear in the operation hole; a fixed pin and a pin lock hole are unlocked by pushing in the projection portion for operation toward a movable pin; and the operation hole directs the projection portion for operation to the center of the spectacles when the temple is opened.

BRIEF SUMMARY OF THE INVENTION

An eyeglass frame is provided that includes a lens retaining part having an end piece, a temple piece, and a hinge connecting the end piece and the temple piece. The hinge includes a substantially cylindrical element having a slot, and a projection coupled to the temple piece and adapted to be received in the slot of the substantially cylindrical element. The hinge further includes a substantially cylindrical support member coupled to the end piece and adapted to accept the substantially cylindrical element, and including retaining means adapted to maintain the projection in the slot of the substantially cylindrical element.

The substantially cylindrical support member may include assembly means adapted to enable at least one of insertion and removal of the projection in the slot of the substantially cylindrical element. The assembly means may include a recess on the substantially cylindrical support member. The recess may be adapted to accommodate passage of the projection through the substantially cylindrical support member when the recess is aligned with the slot.

The substantially cylindrical element may be adapted to form a friction fit with the substantially cylindrical support member when the substantially cylindrical support member accepts the substantially cylindrical element.

The lens retaining part and/or the temple piece may be formed from beta-titanium, stainless steel, and/or any other material having suitable rigidity and flexibility. The substantially cylindrical element may be formed from plastic or another material, including metal, ceramic or wood. The substantially cylindrical element may be formed from a material that does not wear away too easily and that has a lower hardness than the cylindrical support member.

An eyeglass frame is provided that includes a lens retaining part having an end piece, a temple piece, and a hinge connecting the end piece and the temple piece. The hinge includes a substantially cylindrical element having a slot, and a projection coupled to the end piece and adapted to be received in the slot of the substantially cylindrical element. The hinge also includes a substantially cylindrical support member coupled to the temple piece and adapted to accept the substantially cylindrical element and including retaining means adapted to maintain the projection in the slot of the substantially cylindrical element.

A hinge for an eyeglass frame is provided that includes a substantially cylindrical element comprising a slot, and a substantially cylindrical support member in an end region of a first frame part. The substantially cylindrical support member is adapted to accept the substantially cylindrical element and having at least one recess. The hinge further includes a projection in an end region of a second frame part. The projection is adapted to fit in the slot of the substantially cylindrical element and is adapted to be inserted into the slot when the recess of the substantially cylindrical support member is substantially aligned with the slot of the substantially cylindrical element.

The first frame part may be a temple piece and the second frame part may be a lens retaining part. The first frame part may be a lens retaining part and the second frame part may be a temple piece.

The substantially cylindrical element may include two holes in the slot, and the projection may be further adapted to fit in the two holes of the substantially cylindrical element when the recess of the substantially cylindrical support member is aligned with the slot of the substantially cylindrical element.

A method of assembling a hinge for an eyeglass frame is provided that includes inserting a substantially cylindrical element including a slot into a substantially cylindrical support member in an end region of a first frame part. The substantially cylindrical support member includes a recess. The method further includes aligning the slot of the substantially cylindrical element and the recess of the substantially cylindrical support member, and inserting a projection in an end region of a second frame part into the slot of the substantially cylindrical element.

The steps of the method may be performed in the indicated order. The method may include, after inserting the projection into the slot of the substantially cylindrical element, rotating the second frame part with respect to the first frame part to cause the slot of the substantially cylindrical element to be misaligned with the recess of the substantially cylindrical support member.

These objects and the details of the invention will be apparent from the following description and accompanying drawings.

BRIEF DESCRIPTION OF THE DRAWINGS

FIG. 6A is a front view of a cylindrical hinge part in accordance with an exemplary embodiment;

FIG. 6B is a side view of the cylindrical hinge part shown in FIG. 6A in accordance with an exemplary embodiment and showing an interior structure;

FIG. 7 is a partial side view of a temple piece prior to formation into a hinge part in accordance with an exemplary embodiment;

FIG. 8 is a partial side view of a lens retaining part in accordance with an exemplary embodiment.

DETAILED DESCRIPTION OF THE INVENTION

A screw-less hinge design is provided. The frame may be reliable and durable, and may be manufactured with less material, less energy and fewer manufacturing processes than conventional eyeglass frames. An exemplary embodiment of the frame design includes a sheet-metal frame, i.e. a frame completely fabricated from a single piece of metal plate, preferably beta-titanium, stainless steel or other kinds of metal with good flexibility. Alternative exemplary embodiments may utilize a hinge design according to the present disclosure in other types of frames utilizing any appropriate material.

Figure 1:
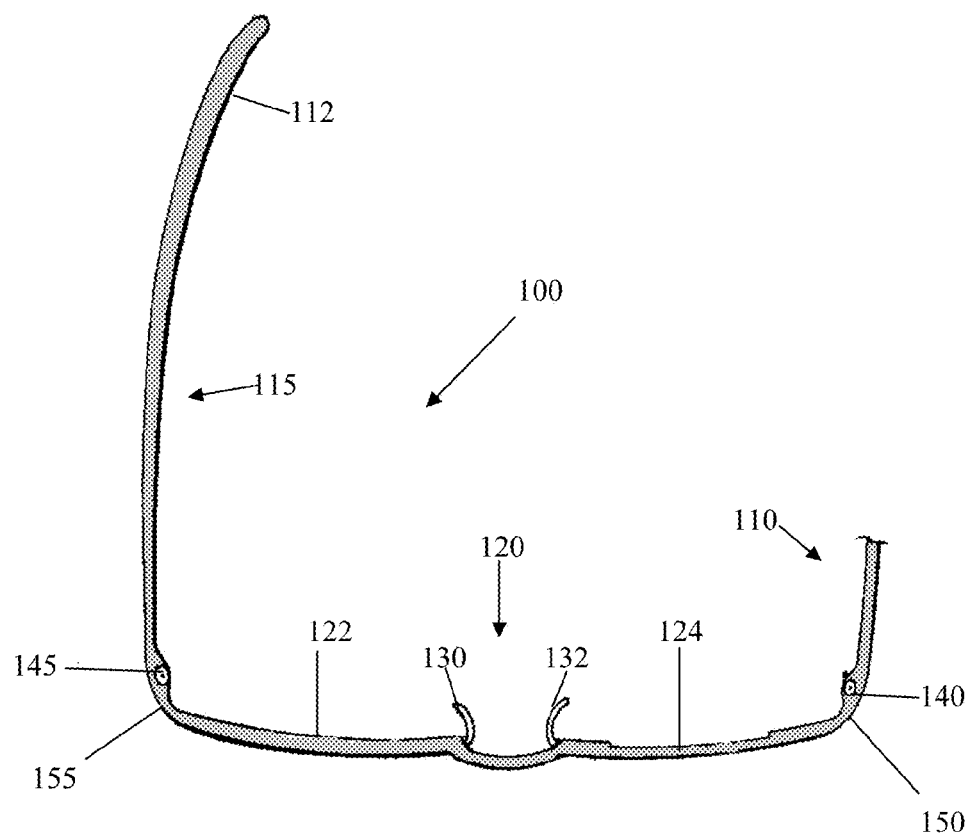
FIG. 1 is a partial plan view of a conventional eyeglass frame.

FIG. 1 is a partial plan view of conventional eyeglass frame 100. Conventional eyeglass frame 100 includes lens retaining part 120 connected to temple pieces 110 and 115 on opposite ends. Lens retaining part 120 includes lens holders 122 and 124, which may hold any appropriate lens, including plastic or glass lenses; clear, dark, or sun-sensitive lenses that change transmittance depending on the ambient light; safety lenses; and/or corrective lenses including near- and far-sighted corrections, bi-focals, and tri-focals. Nosepads 130 and 132 are positioned to rest on a person's nose when the glasses are placed on the head of a person with the lenses over the eyes of the person. End pieces 150 and 155 of lens retaining part 120 are positioned at opposite ends and adjacent to hinges 140 and 145, respectively. Hinge 140 connects end piece 150 of lens retaining part 120 to temple piece 110, and hinge 145 connects end piece 155 of lens retaining part 120 to temple piece 115.

A hinge according to an exemplary embodiment of the present disclosure, which may also be referred to herein as a joint, includes three parts: a temple structure; a plastic core (or a core in another material, including metal, ceramic and/or wood, that is not easily worn away), which may also be referred to herein as a cylinder, cylindrical core or cylindrical element, which serves as an axis; and an endpiece structure which connects to the front, which may also be referred to herein as a lens retaining part or an end piece of a lens retaining part.

Figure 2:
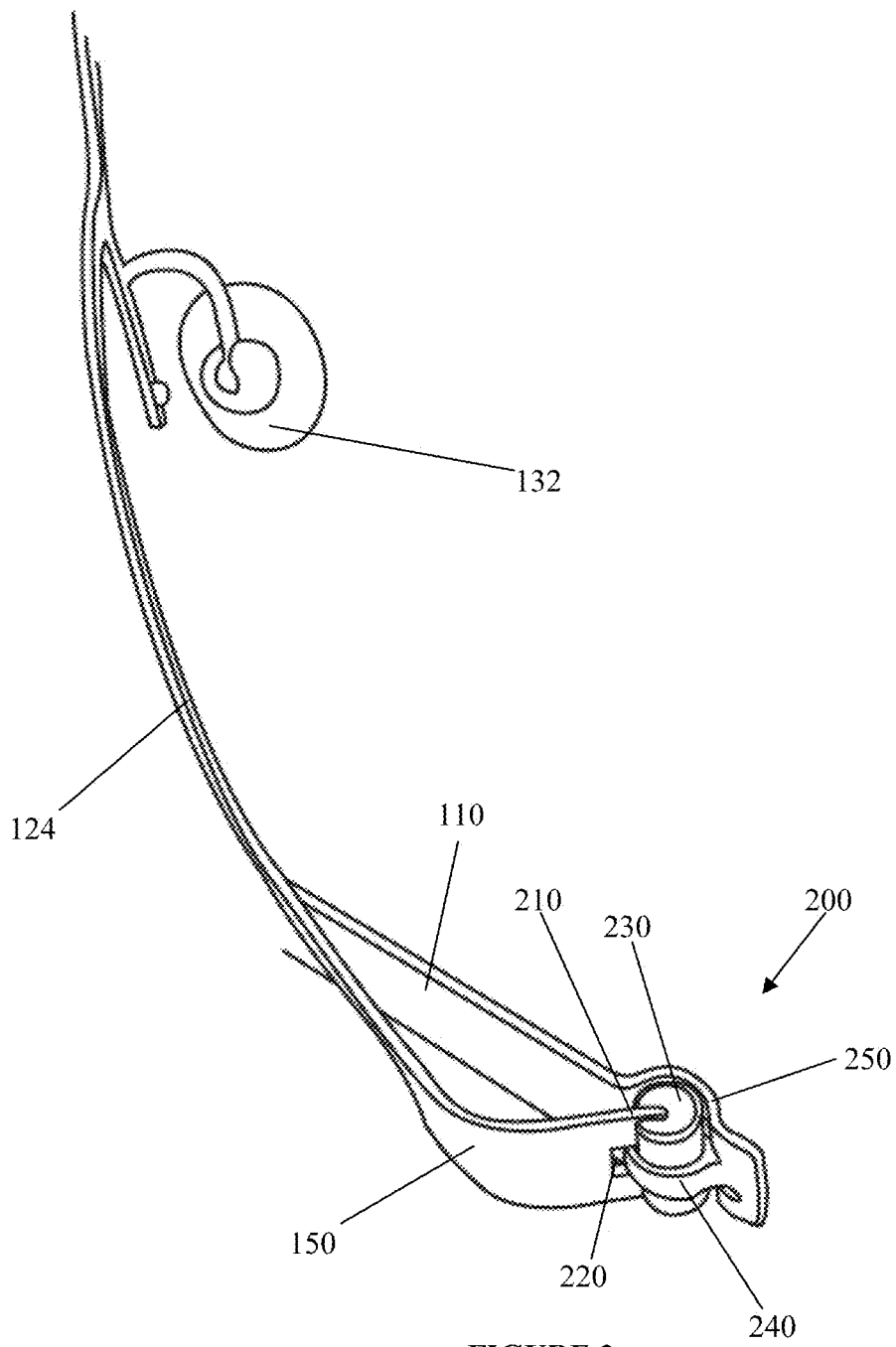
FIG. 2 is a perspective view of an eyeglass hinge in accordance with an exemplary embodiment in a closed position.

FIG. 2 is a perspective view of eyeglass hinge 200 in accordance with an exemplary embodiment in a closed position. The closed position of hinge 200 shown in FIG. 2 may also represent an assembly position in which no lens is present in lens holder 124 allowing temple piece 110 to pass through the space that is defined by lens holder 124 for a lens to allow assembly of hinge 200. Temple piece 110 includes, on one end, first cylindrical support member 240 and second cylindrical support member 250 that are adapted to receive, in combination, cylindrical element 230. First cylindrical support member 240 and second cylindrical support member 250 may be formed from temple piece 110 in a manufacturing step, as discussed hereinafter. Cylindrical element 230 may be cylindrical, substantially cylindrical, or may be any other appropriate shape that enables pivoting of hinge 200. Cylindrical element 230 may be received in first cylindrical support member 240 and second cylindrical support member 250 loosely, or in a friction fit that provides some resistance to the free movement of cylindrical element 230 into and out of first cylindrical support member 240 and second cylindrical support member 250. End piece 150 of a lens retaining part includes projection 210 and cavity 220 on an end proximate to hinge 200.

During the assembly process shown in FIG. 2, temple piece 110 is positioned in an excessively closed position, also referred to herein as a hyper closed position, that may only be possible when no lens is in lens holder 124, or by bending temple piece 110. In the hyper closed position, projections 210 of end piece 150 may be inserted past recesses of first cylindrical support member 240 into a slot in cylindrical element 230.

Figure 3:
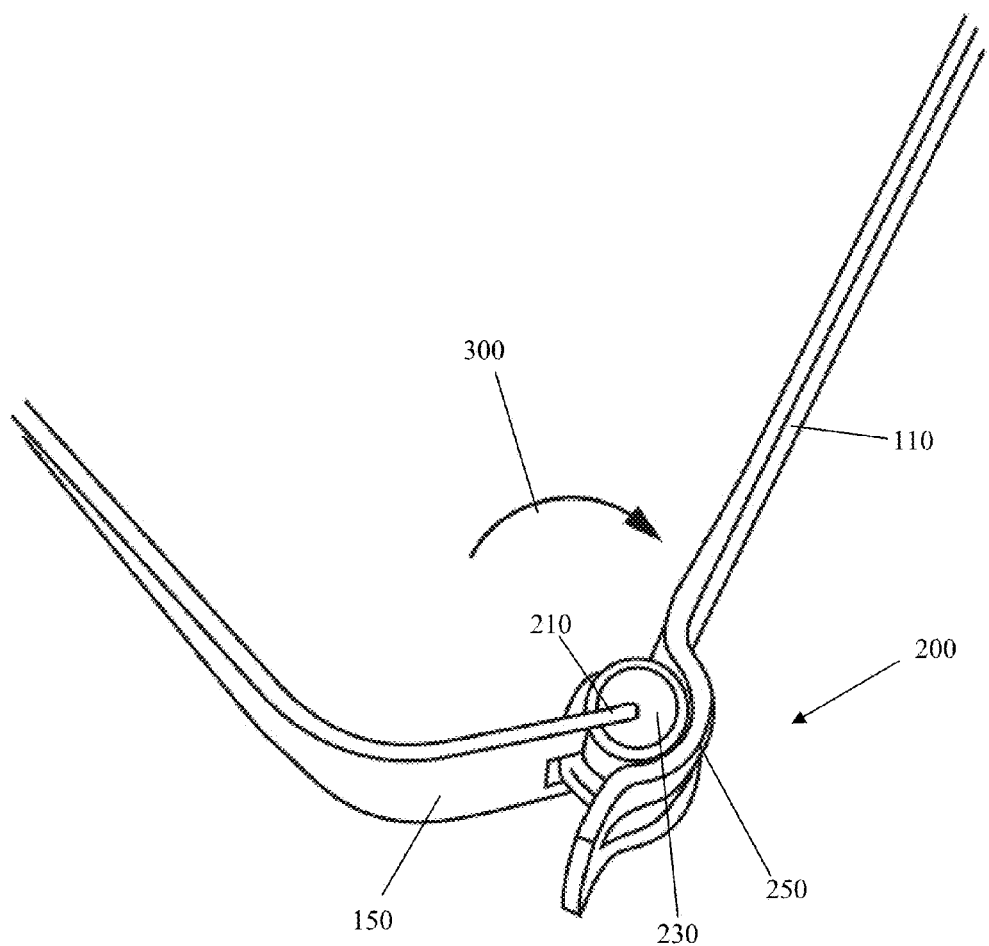
FIG. 3 is a perspective view of the eyeglass hinge of FIG. 2 in accordance with an exemplary embodiment in a partially open position.

FIG. 3 is a perspective view of eyeglass hinge 200 of FIG. 2 in accordance with an exemplary embodiment in a partially open position. In FIG. 3, temple piece 110 is rotated in arcuate direction 300 relative to end piece 150 of a lens retaining part to continue assembly of hinge 200 from the position shown in FIG. 2. Temple piece 110 includes, on an end, second cylindrical support member 250 receiving cylindrical element 230. End piece 150 includes projection 210 on an end proximate to hinge 200 that is received in a slot of cylindrical element 230.

Figure 4:
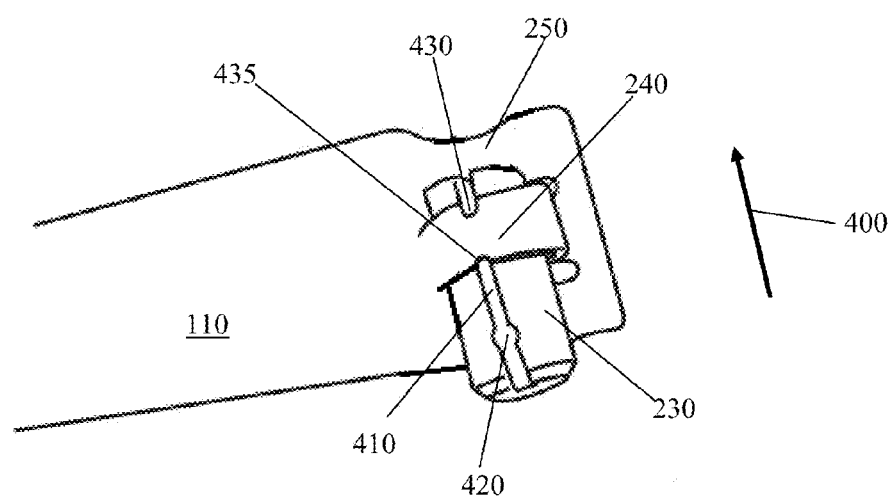
FIG. 4 is a side view of an eyeglass temple piece and part of a hinge in accordance with an exemplary embodiment illustrating an exemplary assembly method.

FIG. 4 is a side view of temple piece 110 and parts of a hinge in accordance with an exemplary embodiment illustrating an exemplary assembly method. Temple piece 110 includes, on an end, first cylindrical support member 240 and second cylindrical support member 250 that are adapted to receive cylindrical element 230. Cylindrical element 230 may be inserted into first cylindrical support member 240 and second cylindrical support member 250 from below by moving in the direction of arrow 400. Alternatively, cylindrical element 230 may be inserted into first cylindrical support member 240 and second cylindrical support member 250 from above by moving in the opposite direction of arrow 400. Cylindrical element 230 includes slot 410 on an outside face of cylindrical element 230 and running axially along the entire face of cylindrical element 230. Slot 410 includes bottom hole 420 arranged at a point in slot 410 such that, when cylindrical element 230 is inserted into first cylindrical support member 240 and second cylindrical support member 250, bottom hole 420 aligns with bottom recess 435 of first cylindrical support member 240. First cylindrical support member 240 also includes top recess 430 positioned opposite bottom recess 435 on first cylindrical support member 240. Cylindrical element 230 is inserted into the circular loop formed by first cylindrical support member 240 and second cylindrical support member 250 to align bottom hole 420 with bottom recess 435 and to align a top hole with top recess 430.

Figure 5:
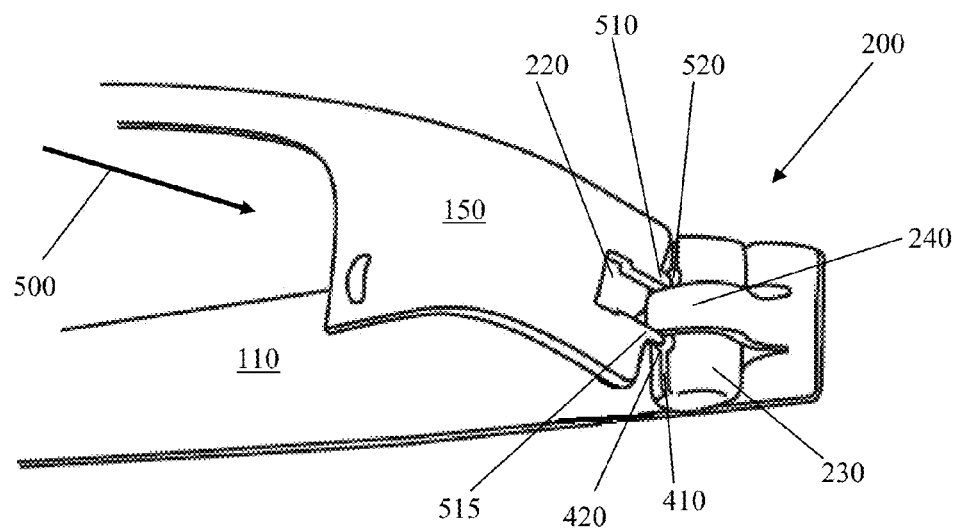
FIG. 5 is a side view of the eyeglass temple piece and the part of a hinge of FIG. 4 and a lens retaining part in accordance with an exemplary embodiment illustrating an exemplary assembly method.

FIG. 5 is a side view of temple piece 110 and the parts of the hinge of FIG. 4 and end piece 150 of a lens retaining part in accordance with an exemplary embodiment. FIG. 5 illustrates temple piece 110 and end piece 150 in a step following the step shown in FIG. 4, and further illustrates an exemplary assembly method. In FIG. 5, cylindrical element 230 has been completely properly inserted into first cylindrical support member 240 and second cylindrical support member 250, and bottom hole 420 in slot 410 is therefore aligned with the bottom recess of first cylindrical support member 240, and top hole 520 in slot 410 is aligned with the top recess of first cylindrical support member 240. End piece 150 of a lens retaining part is moved in the direction of arrow 500 so that top point projection 510 is inserted past the top recess of first cylindrical support member 240 and into top hole 520, and bottom point projection 515 is inserted past the bottom recess of first cylindrical support member 240 and into bottom hole 420. End piece 150 is moved in the direction of arrow 500 until cavity 220 is aligned with first cylindrical support member 240. Cavity 220 has a height (a distance measured along a line perpendicular to projections 510 and 515) equal to or greater than the height (a distance measured parallel to the insertion direction of cylindrical element 230) of first cylindrical support member 240, while the distance between top point projection 510 and bottom point projection 515 is less than the height of first cylindrical support member 240 except at the radial position of the bottom and top recesses of first cylindrical support member 240.

In FIG. 5, end piece 150 has a T-shaped slot formed by top point projection 510, bottom point projection 515, and cavity 220. When assembling hinge 200, top point projection 510 and bottom point projection 515 are inserted into top hole 520 and bottom hole 420, respectively, which is only possible when top hole 520 and bottom hole 420 are aligned with the top and bottom recesses of first cylindrical support member 240, thereby allowing the top point projection 510 and bottom point projection 515 to pass. The top and bottom recesses of first cylindrical support member 240 may be positioned so that a user cannot easily disassemble the structure unless the lenses are taken off the frame, allowing the temple to be twisted against the front (also referred to herein as the hyper closed position).

FIG. 6A is a front view of cylindrical element 230 in accordance with an exemplary embodiment. Cylindrical element 230 has slot 410 running axially on front face 600 of an outside surface of the cylinder. Slot 410 has top hole 520 and bottom hole 420 symmetrically positioned in slot 410, and which may be circular or any other appropriate shape and in any other appropriate position, in any number, depending on design requirements.

FIG. 6B is a side view of cylindrical element 230 shown in FIG. 6A in accordance with an exemplary embodiment and showing an interior structure. The slot of cylindrical element 230 extends from front face 600 into the interior of cylindrical element 230 and terminates at slot termination 610, which may be a substantially axial position in cylindrical element 230. The top and bottom holes of cylindrical element 230 may extend past slot termination 610 to hole termination 620, which may be a significant percentage of the diameter of cylindrical element 230, depending on design requirements.

FIG. 7 is a partial side view of temple end 700 of a temple piece prior to formation into a hinge part in accordance with an exemplary embodiment. Temple end 700 may initially be a flat piece, and may for example be a flat piece of metal, for instance beta-titanium or stainless steel. Temple end 700 may first be cut with two slots 710 and 715 with shapes depicted in FIG. 7. On slots 710 and 715, recesses 430 and 435, respectively, may be formed, which may be slightly off-center towards an ear contact end of the temple piece. To manufacture an inside and second cylindrical support member from temple end 700, central area 720 may be stamped in a direction opposite to edge areas 730 and 735. In this manner, central area 720 may be formed into first cylindrical support member and edge areas 730 and 735 may be formed into second cylindrical support member. Further, the first and second cylindrical support members may form a circular loop that accommodates the plastic core (also referred to herein as the cylindrical core or cylindrical element).

FIG. 8 is a partial side view of end piece 150 of a lens retaining part in accordance with an exemplary embodiment. End piece 150 has a T-shaped slot formed by top point projection 510, bottom point projection 515, and cavity 220. The distance between top point projection 510 and bottom point projection 515 may be equal to or greater than the distance between recesses 430 and 435 shown in FIG. 7, but less than the distance between slots 710 and 715 shown in FIG. 7. The distance between the top and bottom edges of cavity 220 may be equal to or greater than the distance between slots 710 and 715 shown in FIG. 7.

In an alternative embodiment, recesses between slots of a temple end of a temple piece may extend towards the top and bottom edges of the temple end, rather than towards the middle as shown in FIG. 7. In such an alternative embodiment, the end piece of a lens retaining part may extend through the second cylindrical support member rather than through the first cylindrical support member as shown in the primary exemplary embodiment discussed above. Further, the end piece of a lens retaining part in the alternative exemplary embodiment may have a narrow neck extending from the end and having a width equal to or less than the distance between slots of the temple end, and a wider section extending from the neck and having a width equal to or less than the distance between the recesses of the slots of the temple end but greater than the distance between slots of the temple end.

Still further alternative exemplary embodiments are possible, including for instance, the temple structure and the end piece structure being reversed. Therefore the loop can be positioned on the end piece of the lens retaining part, and the projections for inserting into the slots of the cylinder may be arranged on the end of the temple piece.

Figure 9:
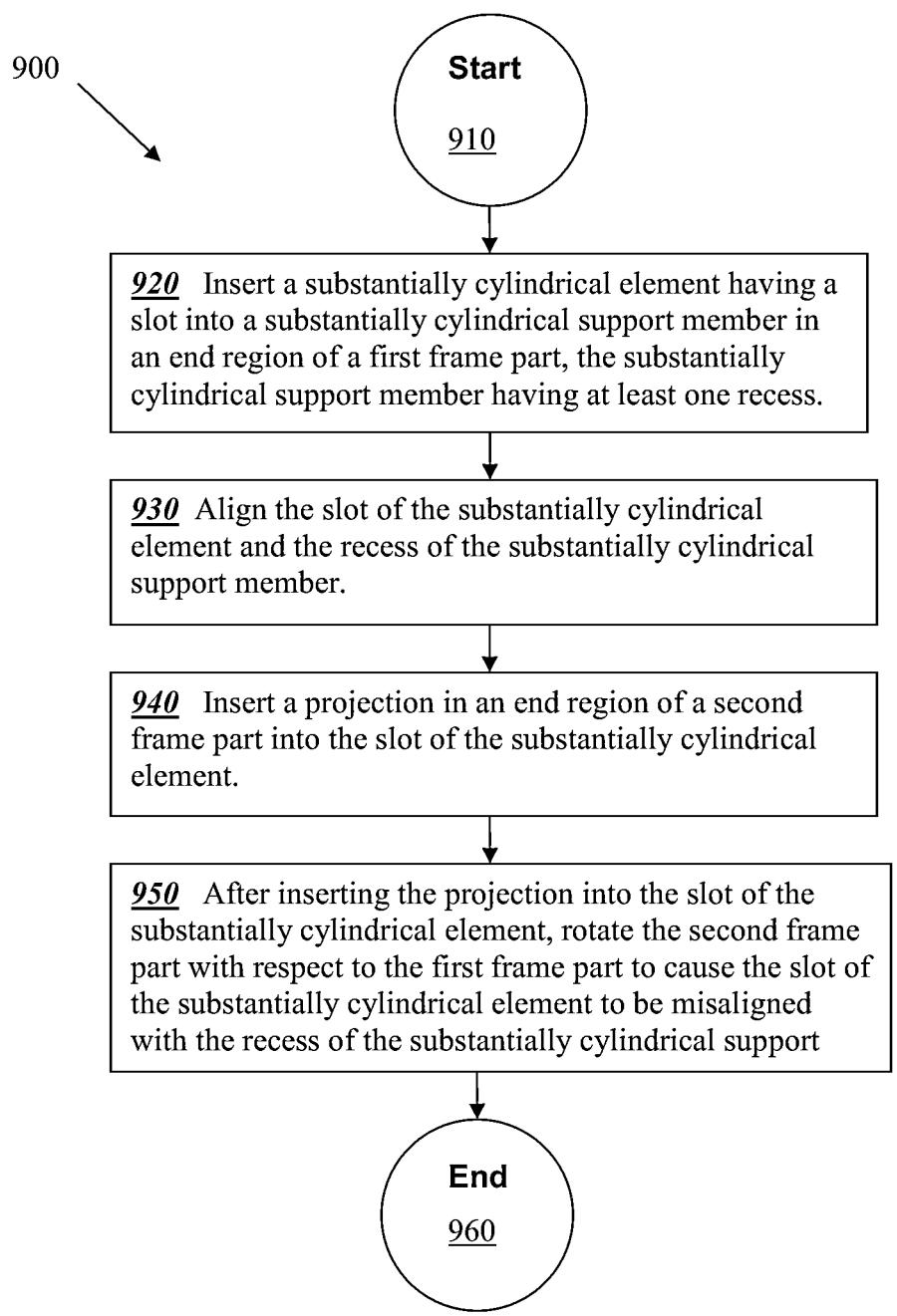
FIG. 9 illustrates a method according to an exemplary embodiment.

FIG. 9 illustrates method 900 according to an exemplary embodiment. Method 900 starts at start circle 910 and proceeds to operation 920, which indicates to insert a substantially cylindrical element having a slot into a substantially cylindrical support member in an end region of a first frame part, the substantially cylindrical support member having at least one recess. From operation 920, the flow in method 900 proceeds to operation 930, which indicates to align the slot of the substantially cylindrical element and the recess of the substantially cylindrical support member. From operation 930, the flow in method 900 proceeds to operation 940, which indicates to insert a projection in an end region of a second frame part into the slot of the substantially cylindrical element. From operation 940, the flow in method 900 proceeds to operation 950, which indicates, after inserting the projection into the slot of the substantially cylindrical element, to rotate the second frame part with respect to the first frame part to cause the slot of the substantially cylindrical element to be misaligned with the recess of the substantially cylindrical support member. From operation 950, the flow in method 900 proceeds to end circle 960.

While only a limited number of preferred embodiments of the present invention have been disclosed for purposes of illustration, many modifications and variations could be made thereto. The present application is intended to cover all of those modifications and variations which fall within the scope of the present invention, as defined by the following claims.

I claim:

1. An eyeglass frame comprising a lens retaining part having an end piece, a temple piece having an edge with a projection, and a hinge connecting the end piece and the temple piece, comprising:
    a substantially cylindrical element being integrally formed having a slot and a hole wherein said hole is aligned with said slot;
    said edge being adapted to be received in the slot of the substantially cylindrical element with said projection in said hole; and
    a substantially cylindrical support member coupled to the end piece, adapted to accept the substantially cylindrical element and comprising retaining means adapted to maintain the projection in the slot of the substantially cylindrical element.

2. The eyeglass frame of claim 1, wherein the substantially cylindrical support member further comprises assembly means adapted to enable at least one of insertion and removal of the projection in said hole of the slot of the substantially cylindrical element.

3. The eyeglass frame of claim 2 wherein the assembly means comprise a recess on the substantially cylindrical support member, the recess being adapted to accommodate passage of the projection through the substantially cylindrical support member when the recess is aligned with the slot.

4. The eyeglass frame of claim 1, wherein the substantially cylindrical element is adapted to form a friction fit with the substantially cylindrical support member when the substantially cylindrical support member accepts the substantially cylindrical element.

5. The eyeglass frame of claim 1, wherein:
    at least one of the lens retaining part and the temple piece is formed from at least one of beta-titanium and stainless steel; and
    the substantially cylindrical element is formed from at least one of plastic, metal, ceramic, and wood.

6. An eyeglass frame comprising a lens retaining part having an end piece with an edge having a projection, a temple piece, and a hinge connecting the end piece and the temple piece, the hinge comprising:
    a substantially cylindrical element being integrally formed having a slot and a hole wherein said hole is aligned with said slot;
    said edge being adapted to be received in the slot of the substantially cylindrical element with said projection in said hole; and
    a substantially cylindrical support member coupled to the temple piece and adapted to accept the substantially cylindrical element and comprising retaining means adapted to maintain the projection in the slot of the substantially cylindrical element.

7. The eyeglass frame of claim 6, wherein the substantially cylindrical support member further comprises assembly means adapted to enable at least one of insertion and removal of the projection in said hole in the slot of the substantially cylindrical element.

8. The eyeglass frame of claim 7 wherein the assembly means comprise a recess on the substantially cylindrical support member, the recess being adapted to accommodate passage of the projection through the substantially cylindrical support member when the recess is aligned with the slot.

9. The eyeglass frame of claim 6, wherein the substantially cylindrical element is adapted to form a friction fit with the substantially cylindrical support member when the substantially cylindrical support member accepts the substantially cylindrical element.

10. The eyeglass frame of claim 6, wherein:
    at least one of the lens retaining part and the temple piece is formed from at least one of beta-titanium and stainless steel; and
    the substantially cylindrical element is formed from at least one of plastic, metal, ceramic, and wood.

11. A hinge for an eyeglass frame, comprising:
    a substantially cylindrical element being integrally formed comprising a slot and a hole wherein said hole is aligned with said slot;
    a substantially cylindrical support member in an end region of a first frame part, the substantially cylindrical support member adapted to accept the substantially cylindrical element and having at least one recess; and
    a projection in an end region of a second frame part, the projection adapted to fit in the slot of the substantially cylindrical element and adapted to be inserted into the slot when the recess of the substantially cylindrical support member is substantially aligned with the slot of the substantially cylindrical element.

12. The hinge of claim 11, wherein the first frame part is a temple piece and the second frame part is a lens retaining part.

13. The hinge of claim 11, wherein the first frame part is a lens retaining part and the second frame part is a temple piece.

14. The hinge of claim 11, wherein:
    the substantially cylindrical element further comprises two holes in the slot; and the projection is further adapted to fit in the two holes of the substantially cylindrical element when the recess of the substantially cylindrical support member is aligned with the slot of the substantially cylindrical element.

15. The hinge of claim 11, wherein:

at least one of the lens retaining part and the temple piece is formed from at least one of beta-titanium and stainless steel; and the substantially cylindrical element is formed from at least one of plastic, metal, ceramic, and wood.

16. A method of assembling a hinge for an eyeglass frame, comprising:

a) inserting a substantially cylindrical element being integrally formed comprising a slot and a hole wherein said hole is aligned with said slot into a substantially cylindrical support member in an end region of a first frame part, the substantially cylindrical support member comprising a recess;

b) aligning the slot of the substantially cylindrical element and the recess of the substantially cylindrical support member; and c) inserting a projection in an end region of a second frame part into the slot of the substantially cylindrical element.

17. The method of claim 16, wherein the steps of the method are performed in the order a) then b), then c).

18. The method of claim 17, further comprising, after step c), rotating the second frame part with respect to the first frame part to cause the slot of the substantially cylindrical element to be misaligned with the recess of the substantially cylindrical support member.

19. The method of claim 16, wherein the first frame part is a temple piece and the second frame part is a lens retaining part.

20. The method of claim 16, wherein the first frame part is a lens retaining part and the second frame part is a temple piece.

21. An eyeglass frame comprising a lens retaining part having an end piece, a temple piece, and a hinge connecting the end piece and the temple piece, comprising:

a substantially cylindrical element being integrally formed having a slot and a hole wherein said hole is aligned with said slot;

a projection coupled to the temple piece and adapted to be received in the slot of the substantially cylindrical element; and a substantially cylindrical support member coupled to the end piece and adapted to accept the substantially cylindrical element and comprising retaining means adapted to maintain the projection in the slot of the substantially cylindrical element, wherein the substantially cylindrical support member comprises assembly means adapted to enable at least one of insertion and removal of the projection in the slot of the substantially cylindrical element, wherein the assembly means comprises a recess on the substantially cylindrical support member, the recess being adapted to accommodate passage of the projection through the substantially cylindrical support member when the recess is aligned with the slot.

22. An eyeglass frame comprising a lens retaining part having an end piece, a temple piece, and a hinge connecting the end piece and the temple piece, comprising:

a substantially cylindrical element being integrally formed having a slot and a hole wherein said hole is aligned with said slot;

a projection coupled to the end piece and adapted to be received in the slot of the substantially cylindrical element; and a substantially cylindrical support member coupled to the temple piece and adapted to accept the substantially cylindrical element and comprising retaining means adapted to maintain the projection in the slot of the substantially cylindrical element, wherein the substantially cylindrical support member comprises assembly means adapted to enable at least one of insertion and removal of the projection in the slot of the substantially cylindrical element and wherein the assembly means comprise a recess on the substantially cylindrical support member, the recess being adapted to accommodate passage of the projection through the substantially cylindrical support member when the recess is aligned with the slot.

23. The frame of claim 1 wherein the temple piece further comprises a substantially "T" shaped cavity.

24. The frame of claim 1 wherein said cylindrical element is formed of a single piece.

25. The frame of claim 6 wherein the end piece further comprises a substantially "T" shaped cavity.

26. The frame of claim 6 wherein said cylindrical element is formed of a single piece.

* * * * *